United States Patent Office 3,236,842
Patented Feb. 22, 1966

3,236,842
N-TRIFLUOROMETHYLATED SULPHENAMIDES AND PROCESS FOR THE PRODUCTION THEREOF
Erich Klauke, Cologne-Flittard, and Engelbert Kühle, Cologne-Stammheim, Germany, assignors to Farbenfabriken Bayer Aktiengesellschaft, Leverkusen, Germany, a corporation of Germany
No Drawing. Filed July 24, 1962, Ser. No. 212,114
Claims priority, application Germany, July 26, 1961, F 34,531
9 Claims. (Cl. 260—247.1)

The present invention relates to and has as its objects new and useful insecticidal, acaricidal and fungicidal compounds. More specifically this invention relates to N-trifluoromethylated sulphenamides of the general formula

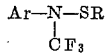

as well as to a process for the production of such compounds.

In the above formula Ar represents an optionally substituted aromatic radical, while R is an optionally substituted aliphatic or aromatic radical, a heterocyclic radical or a secondary optionally cyclic amino group, and R can further stand for a halogen atom or a radical X—S, whereby X is chlorine or bromine, the second halogen atom then being capable of reaction with a second molecule of N-trifluoromethyl aryl amine.

Finally this invention is concerned with improvements in insecticidal, fungicidal and acaricidal preparations and more particularly to improved insecticides, acaricides and fungicides as well as to methods of protecting organic material especially plants subject to attack by insects and fungi.

In accordance with the present invention it has been found that the N-trifluoromethylated sulphenamides of the above mentioned general formula are distinguished by outstanding insecticidal, fungicidal and acaricidal properties combined with a good plant tolerance and a high initial and long lasting activity. The compounds are therefore particularly suitable as pest control agents, especially for plant-protecting and controlling the growth of fungi.

The novel inventive compounds can be prepared by reaction of sulphenic acid halides of the general formula

X—S—R with N-trifluoromethyl aryl amines of the formula

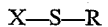

preferably in the presence of acid-binding agents. The reaction according to the present invention may be represented by the following general scheme:

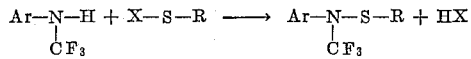

This scheme is only given for the purpose of illustrating the invention and is not intended to limit it in any way.

In the aforementioned formulae the symbols Ar, X and R have the significance as given above.

The N-trifluoromethyl aryl amines necessary as starting materials for the inventive process can readily be produced from aromatic isocyanide dichlorides and fluoric acid according to "K. A. Petrov: Z. obsc. Chem." 29, 2169 (1959). Suitable compounds are e.g. N-trifluoromethyl aniline, chlorinated and/or nitrated N-trifluoromethyl anilines or -toluidines, N-trifluoromethyl naphthyl amines and 1,4-bis-N-trifluoromethyl phenylene diamines.

As sulphenic acid halides to be reacted according to the invention there can be used for example methane-sulphenic acid bromide, fluorodichloro-methane sulphenic acid chloride, perchloromethyl mercaptan, bromochlorofluoro- and dibromofluoromethane sulphenic acid bromide, benzene-sulphenic acid chloride, 4-nitrobenzene-sulphenic acid chloride, pentachloro-benzene-sulphenic acid chloride, benzthiazolyl-2-sulphenic acid chloride, morpholine sulphenic acid bromide, trimethyl-sulphamido-sulphenic acid chloride, monosulphur dichloride, and disulphur dichloride.

The reaction according to the present invention is conducted expediently at room temperature or slightly elevated temperatures preferably in the presence of an acid-binding agent and in an inert organic solvent.

As solvents there may be considered optionally halogenated aliphatic and aromatic hydrocarbons e.g. chloroform, carbon tetrachloride, benzene, chlorobenzene, xylol, toluol, dioxane and the like and as acid-binding agents alkali-hydroxides, -alcoholates, -carbonates or tertiary amines have been proved. In some cases, however, it is also possible to carry out the inventive reaction in an aqueous alkaline medium if the stability of the corresponding sulphenic acid halide is sufficient.

As already mentioned above the new N-trifluoromethylated sulphenamides are valuable pesticides and possess especially an outstanding insecticidal, acaricidal and fungicidal action. They are therefore employed as plant protection agents, mainly as insecticides and fungicides. Furthermore the inventive compounds serve as intermediate products for further organic syntheses.

As an example for the special utility the inventive compounds of the following formulae (I) 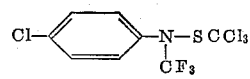

(II) 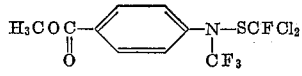

(III) 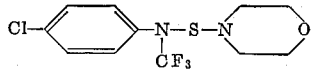

have been tested against spider mites, caterpillars and mustard flies (compounds I and III) and against mosquito larvae (compound II).

Aqueous dilutions of these compounds have been prepared by mixing the active ingredients with the same amounts of dimethyl formamide as an auxiliary solvent adding thereto 20% by weight referred to active ingredient of a commercial emulsifier consisting of a benzyl hydroxy polyglycol ether containing about 10 to 15 glycol ethers, and diluting this premixture at last with water to the desired concentration indicated in the following paragraphs:

The tests have been carried out as follows.

(a) Against spider mites: Bean plants (*Phaseolus vulgaris*) of about 15 inches height are sprayed drip wet with solutions as prepared above and in a concentration as shown below. The bean plants have been infested heavily with the two-spotted spider (species *Tetranychus telarius*). Evaluation has been carried out after 24 hours, 48 hours and 8 days. The following results have been obtained:

| Compound aqueous concentration (in percent active ingredient/water) | Killing rate (in percent) |
|---|---|
| (I) | 0.2 | 100 |
| (III) | 0.2 | 100 |

(b) Against caterpillars of the type diamondback moth (*Plutella maculipennis*): White cabbage has been sprayed drip wet with aqueous emulsions as prepared above in a concentration as shown below. Caterpillars (10 each) have been placed on the sprayed leaves of the white cabbage. The living status has been determined after 24 and 48 hours. The following results have been obtained:

| Compound aqueous concentration (in percent active ingredient/water) | Killing rate (in percent) |
|---|---|
| (I) | 0.2 | 100 |
| (III) | 0.2 | 100 |

(c) Against mustard flies: About 50 flies (*Drosophila melanogaster*) are placed under covered petri dishes in which, drip wet filter papers have been placed which are sprayed with insecticidal solutions of concentrations as shown below. The living status of the flies has been determined after 24 hours. The following results have been obtained:

| Compound aqueous concentration (in percent active ingredient/water) | Killing rate (in percent) |
|---|---|
| (I) | 0.02 | 100 |
| (III) | 0.2 | 100 |

(d) Against mosquito larvae of the type *Aedes aegypti*: About 20 larvae were brought into diluted aqueous emulsions prepared as described above. Counting of the dead pests occurred after 24 hours. The following results have been obtained:

| Compound aqueous concentration (in percent active ingredient/water) | Killing rate (in percent) |
|---|---|
| (III) | 0.0001 | 70 |
|  | 0.001 | 100 |

The following examples are given for the purpose of illustrating the invention:

*Example 1*

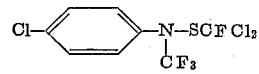

19.6 g. of 4-chloro-N-trifluoromethyl aniline (B.P. 74 to 75° C./10 mm. Hg) are dissolved in 100 ml. of benzene with addition of 10.1 g. of triethylamine and subsequently the mixture is treated dropwise at room temperature, with cooling, with 17 g. of fluorodichloromethanesulphenic acid chloride. The reaction mixture is shaken out with water, the benzene layer dried overnight with sodium sulphate, concentrated in vacuum and the residue distilled. 27 g. of dichlorofluoromethane-N-(trifluoromethyl) - N - (4 - chlorophenyl) - sulphenamide of B.P. 116–123° C./11 mm. Hg are obtained in this way. Caterpillars are completely destroyed by 0.2% solutions, mustard flies (*Drosophila melanogaster*) even by 0.02% solutions of the compound. In an analogous manner the following compounds may be produced:

| Structure | Physical properties (B.P. in ° C.) | Biological activity | | |
|---|---|---|---|---|
|  |  | Application against— | Aqueous concentration in percent active ingredient/water | Killing rate (percent) |
| Cl—⟨⟩—N—SCCl₃, CF₃ | 138–148/11 mm. Hg | Caterpillars | 0.2 | 100 |
|  |  | Mustard flies | 0.02 | 100 |
|  |  | Spider mites | 0.2 | 100 |
| Cl—⟨Cl⟩—N—SCFCl₂, CF₃ | 125–135/10 mm. Hg | Caterpillars | 0.2 | 100 |
|  |  | Mustard flies | 0.02 | 100 |
| O₂N—⟨Cl⟩—N—SCFCl₂, CF₃ | Oily | Caterpillars | 0.2 | 100 |
|  |  | Mustard flies | 0.2 | 100 |

| Structure | Physical properties (B.P. in ° C.) | Biological activity | | |
|---|---|---|---|---|
| | | Application against— | Aqueous concentration in percent active ingredient/water | Killing rate (percent) |
| O₂N—C₆H₄—N(CF₃)—SCFCl₂ | ----do---- | Mustard flies | 0.02 | 100 |
| | | Spider mites | 0.2 | 100 |
| H₃COC(O)—C₆H₄—N(CF₃)—SCFCl₂ | 115–130/0.15 mm. Hg | Mosquito larvae | 0.0001 | 70 |
| | | | 0.001 | 100 |
| O₂N—C₆H₄—N(CF₃)—SCHCl·CCl₃ | Oily | | | |
| C₆H₅—N(CF₃)—SCCl₃ | ----do---- | | | |
| 2,4,5-Cl₃C₆H₂—N(CF₃)—SCFCl₂ | 105–109/0.15 mm. Hg | | | |
| 2-Cl-4-NO₂-C₆H₃—N(CF₃)—SCFCl₂ | Oily | | | |
| O₂N—C₆H₄—N(CF₃)—SCCl₃ | ----do---- | | | |
| CH₃—C₆H₄—N(CF₃)—SCFBrCl | ----do---- | | | |
| Cl—C₆H₄—N(CF₃)—SCFBrCl | ----do---- | | | |
| 3,4-Cl₂C₆H₃—N(CF₃)—SCFBrCl | ----do---- | | | |
| 2-Cl-C₆H₄—N(CF₃)—SCFCl₂ | 105–110/10 mm. Hg | | | |
| C₆Cl₅—N(CF₃)—SCCl₃ | Oily | | | |
| 2,4-F₂-triazinyl—N(CF₃)—SCFCl₂ | ----do---- | | | |

Example 2

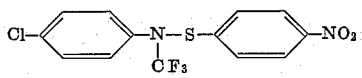

19.6 g. of 4-chloro-N-trifluoromethyl aniline and 19.0 g. 4-nitrophenyl sulphenic chloride are dissolved in 100 ml. of benzene and the resulting solution is treated dropwise at 20 to 30° C. with 10.1 g. of triethylamine. Subsequently the triethylammonium hydrochloride is filtered off with suction, the filtrate is concentrated and 35 g. 4-nitrophenyl - N - (trifluoromethyl) - N - (4-chlorophenyl)-sulphenamide in the form of an undistillable dark coloured oil are obtained in this way. Spider mites are killed to 100% by 0.2% solutions of the compound. The following compounds result by working in an analogous manner:

| Structure | Physical properties | Biological activity | | |
|---|---|---|---|---|
| | | Application against— | Aqueous concentration in percent active ingredient/water | Killing rate |
| 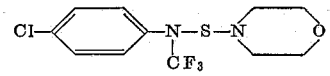 | Oily | Spider Mites<br>Caterpillars<br>Mustard flies | 0.2<br>0.2<br>0.2 | 100<br>100<br>100 |
| 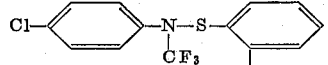 | ___do___ | | | |
| 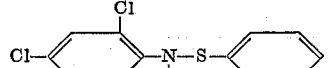 | ___do___ | | | |
| 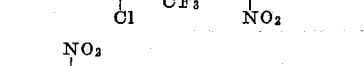 | | | | |
| 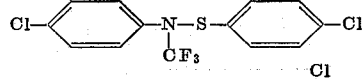 | | | | |
| 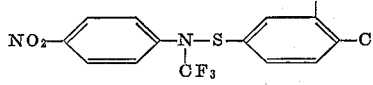 | | | | |

Example 3

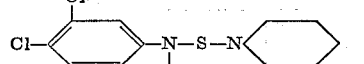

98 g. of 4-chlorophenyl-N-trifluoromethyl aniline are dissolved in 500 ml. benzene with addition of 50.5 g. of triethyl-amine and the mixture is treated dropwise at room temperature with cooling, with 33.4 g. of disulphur dichloride. After stirring for some time, the reaction solution is shaken out with water and the benzene layer concentrated in vacuum, after drying over sodium sulphate. There remain 85 g. of the compound of the above formula as an undistillable oil.

In the same way there may be obtained the following compounds:

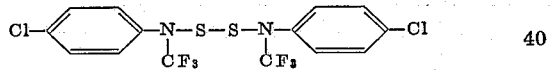

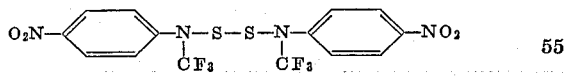

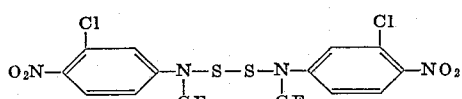

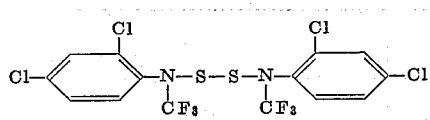

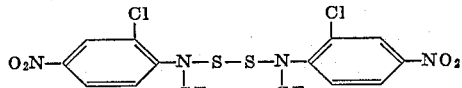

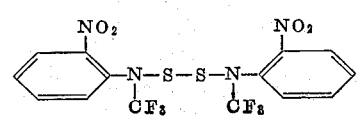

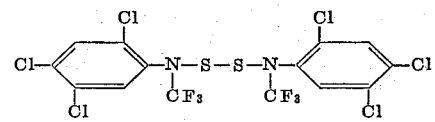

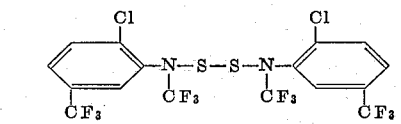

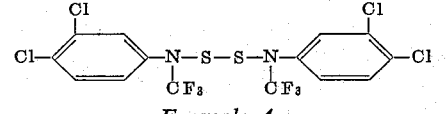

Example 4

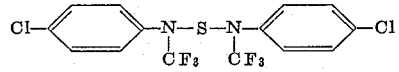

12.9 g. of monosulphur dichloride are added dropwise to a mixture of 49 g. of N-trifluoromethyl-4-chloroaniline and 20 g. of pyridine. After slowly heating to 60° C., the reaction solution is held 15 minutes at this temperature, the pyridinium hydrochloride is filtered off with suction and the filtrate shaken out with water. The organic layer is then distilled. 41 g. of a slowly crystallizing oil of B.P. 128–129° C./0.01 mm. Hg and M.P. 51–52.5° C. are obtained. By exactly the same method there may be produced the following compounds:

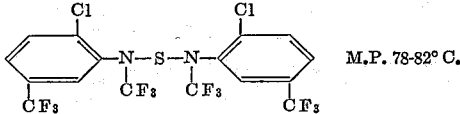 M.P. 78–82° C.

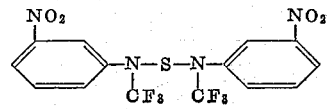

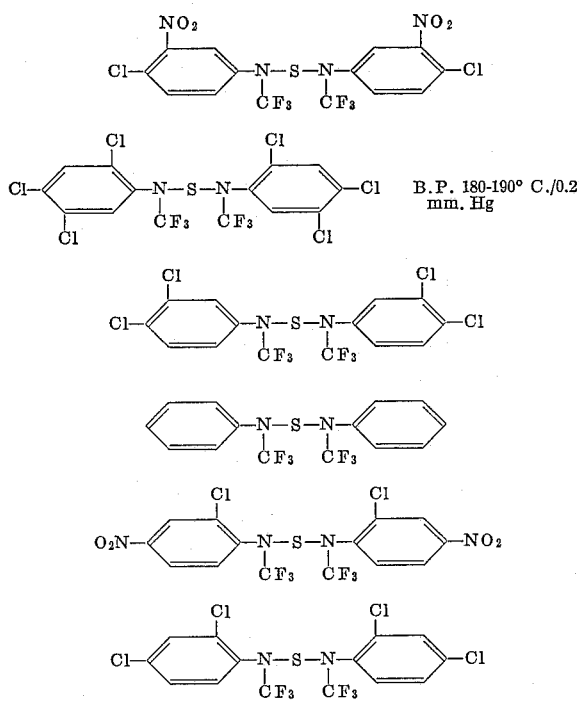

We claim:
1. The compound having the formula

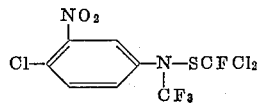

2. The compound having the formula

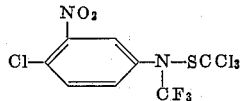

3. The compound having the formula

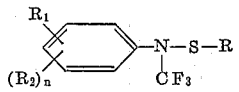

4. The compound having the formula

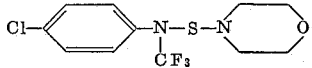

5. The compound having the formula

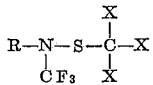

6. The compound having the formula $$Cl-\phantom{x}\phantom{x}-N-SCCl_3$$
$$\phantom{xxxxxx}|\phantom{x}$$
$$\phantom{xxxxxx}CF_3$$

(with NO₂ on ring)

7. A compound having the formula $$\underset{(R_2)_n}{\overset{R_1}{\bigcirc}}-\underset{CF_3}{\overset{|}{N}}-S-R$$

wherein R is a member selected from the group consisting of morpholino and piperidino; $R_1$ is halo; $R_2$ is halo; and $n$ is a whole number of 0–1; $n$ being defined as 1 when R is piperidino and defined as 0 when R is morpholino.

8. The compound having the formula $$Cl-\bigcirc-\underset{CF_3}{\overset{|}{N}}-S-N\bigcirc O$$

9. A compound having the formula $$R-N-S-C-X$$
with CF₃ on N and X, X on C wherein R is a member selected from the group consisting of a chlorophenyl, nitrophenyl and chloro-nitro phenyl; and X is a member selected from the group consisting of chloro, fluoro, at least two of the X groups being chloro.

References Cited by the Examiner

UNITED STATES PATENTS

| | | | |
|---|---|---|---|
| 2,474,237 | 6/1949 | Edy | 260—551 |
| 2,476,655 | 7/1949 | Fox et al. | 260—511 XR |
| 2,553,770 | 5/1951 | Kittleson | 260—551 XR |
| 2,844,628 | 7/1958 | Kuhle et al. | 260—551 |
| 2,867,658 | 1/1959 | Frick | 260—551 |
| 2,962,417 | 11/1960 | Harris | 167—30 |

OTHER REFERENCES

Reid: "Organic Chemistry of Bivalent Sulfur," vol. 11, pages 296–7, Chemical Publishing Co., N.Y. (1960).

Stevens: Tetrahedron Letters, No. 17, pages 16 to 18 (1959).

Stevens: J. Org. Chem., vol. 26, pages 3451 to 3457 (September 1961).

WALTER A. MODANCE, *Primary Examiner.*

JOHN D. RANDOLPH, *Examiner.*